(12) United States Patent
Li

(10) Patent No.: US 9,310,620 B2
(45) Date of Patent: Apr. 12, 2016

(54) LASER BEAM COLLIMATION APPARATUS AND MANUFACTURING METHOD THEREOF

(71) Applicants: HISENSE CO., LTD., Qingdao, Shandong (CN); HISENSE USA CORPORATION, Suwanee, GA (US)

(72) Inventor: Qiang Li, Shandong (CN)

(73) Assignees: HISENSE CO., LTD., Qingdao, Shandong (CN); HISENSE USA CORPORATION, Suwanee, GA (US)

( * ) Notice: Subject to any disclaimer, the term of this patent is extended or adjusted under 35 U.S.C. 154(b) by 0 days.

(21) Appl. No.: 14/514,088

(22) Filed: Oct. 14, 2014

(65) Prior Publication Data
US 2015/0116839 A1    Apr. 30, 2015

(30) Foreign Application Priority Data
Oct. 31, 2013   (CN) .......................... 2013 1 0533792

(51) Int. Cl.
  *G02B 27/30*   (2006.01)
  *G02B 3/00*    (2006.01)
  *H01S 3/08*    (2006.01)

(52) U.S. Cl.
  CPC ..................................... *G02B 27/30* (2013.01)

(58) Field of Classification Search
USPC .......... 359/641–650; 372/50, 23, 98, 101, 107
See application file for complete search history.

(56) References Cited

U.S. PATENT DOCUMENTS

| | | | | |
|---|---|---|---|---|
| 4,720,168 A | * | 1/1988 | Kaneko | G02B 6/4204 359/218.1 |
| 5,383,168 A | * | 1/1995 | O'Brien | G11B 7/12 359/196.1 |
| 5,576,826 A | * | 11/1996 | Hamar | G01B 11/27 33/286 |

* cited by examiner

*Primary Examiner* — Mohammed Hasan
(74) *Attorney, Agent, or Firm* — Tim Tingkang Xia, Esq.; Locke Lord LLP

(57) ABSTRACT

Certain aspects of the disclosure relates to a laser beam collimation apparatus and a manufacturing method thereof. In one exemplary embodiment, the laser beam collimation apparatus includes a laser and a collimating lens disposed opposite the laser, in which the laser is mounted on a laser seat, and the collimating lens is mounted on a collimating lens seat. A transparent rigid ring is provided between the collimating lens seat and the laser seat, and at least one gap is provided between the transparent rigid ring and the laser seat and between the transparent rigid ring and the collimating lens seat, and the at least one gap is filled with a photosensitive adhesive, wherein the at least one gap comprises at least one of a first gap between the transparent rigid ring and the laser seat and a second gap between the transparent rigid ring and the collimating lens seat.

19 Claims, 9 Drawing Sheets

LASER BEAM COLLIMATION APPARATUS AND MANUFACTURING METHOD THEREOF

CROSS-REFERENCE TO RELATED APPLICATION

This application claims the priority to Chinese Patent Application No. 201310533792.4, filed on Oct. 31, 2013, in the State Intellectual Property Office of P.R. China, which is hereby incorporated herein in its entirety by reference.

FIELD OF THE DISCLOSURE

The present disclosure relates to laser technology, and more particularly, to a laser beam collimation apparatus and a manufacturing method thereof.

BACKGROUND

Currently, laser light sources gradually show strong vitality in the projection device market, and an increasing number of manufacturers start launching a variety of laser projection products. A laser, as the core of a laser light source, is an essential and indispensable component. The laser is an apparatus capable of emitting a laser beam mainly utilizing a principle of stimulated radiation, where light is amplified or oscillated within some stimulated substances for emission. There are multiple types of lasers. For example, based on different working mediums, lasers can be classified into gas lasers, solid-state lasers, semiconductor lasers, dye lasers, and other types.

SUMMARY

One aspect of the present disclosure relates to a laser beam collimation apparatus, which includes a laser; and a collimating lens disposed opposite to the laser, where the laser is detachably mounted on a laser seat, and the collimating lens is detachably mounted on a collimating lens seat, and where an adapter support is provided between the collimating lens seat and the laser seat.

In certain exemplary embodiments, a photosensitive adhesive is filled in at least one of a first gap defined between the adapter support and the laser seat and a second gap defined between the adapter support and the collimating lens seat.

In certain exemplary embodiments, a photosensitive adhesive is filled between the adapter support and the collimating lens.

In certain exemplary embodiments, the laser seat includes a base seat and a fixing seat detachably mounted on the base seat.

In certain exemplary embodiments, the fixing seat is detachably mounted on the base seat by an elastic piece, the elastic piece has a bump facing the base seat, a side arm of the fixing seat extends outwards to form a protruding portion, and the protruding portion has a clamping groove fitting with the bump.

In certain exemplary embodiments, the base seat includes at least one positioning rib near the fixing seat, and the fixing seat abuts the at least one positioning rib when the fixing seat and the elastic piece are pressed together.

In certain exemplary embodiments, each of the at least one positioning rib has a screw hole, and the elastic piece is fixed onto the positioning rib by a screw corresponding to the screw hole.

Another aspect of the present disclosure relates to a laser beam collimation apparatus, which includes: a laser; and a collimating lens disposed opposite to the laser, where the laser is fixed on a laser seat, and the collimating lens is fixed on a collimating lens seat; where a transparent rigid ring is provided between the collimating lens seat and the laser seat; and where at least one gap is provided between the transparent rigid ring and the laser seat and between the transparent rigid ring and the collimating lens seat, and the at least one gap is filled with a photosensitive adhesive, where the at least one gap includes at least one of a first gap between the transparent rigid ring and the laser seat and a second gap between the transparent rigid ring and the collimating lens seat.

In certain exemplary embodiments, a third gap is provided between the transparent rigid ring and the collimating lens, and the third gap is filled with the photosensitive adhesive.

In certain exemplary embodiments, the transparent rigid ring is a quartz glass ring.

In certain exemplary embodiments, the laser seat includes a base seat, a fixing seat is detachably mounted on the base seat by an elastic piece, a slit is provided between the elastic piece and the base seat when the elastic piece is fixed on the base seat, a side wall of the fixing seat extends outwards to form a protruding portion, and the fixing seat is movable relative to the elastic piece, such that the protruding portion is received in the slit or is detached from the slit.

In certain exemplary embodiments, the elastic piece has a bump facing the base seat, the protruding portion has a clamping groove fitting with the bump, and the fixing seat is rotatable relative to the elastic piece, such that the clamping groove and the bump are pressed together to receive the protruding portion in the gap, or the clamping groove is detached from the bump to detach the protruding portion from the gap.

In certain exemplary embodiments, a preset pressing amount exists when the bump and the clamping groove are pressed together.

In certain exemplary embodiments, when the bump and the clamping groove are pressed together, the bump contacts a middle portion of the clamping groove to form a fourth gap between each of two sides of the bump and the clamping groove, respectively.

In certain exemplary embodiments, the base seat includes a pair of positioning ribs disposed diagonally near the fixing seat, and the fixing seat abuts the positioning ribs when the fixing seat and the elastic piece are pressed together.

In certain exemplary embodiments, the base seat is disposed with a plurality of lasers and a plurality of fixing seats arranged in arrays and corresponding to each other one-by-one; the base seat includes a plurality of pairs of positioning ribs, and for each of the fixing seats, one of the plurality of pairs of positioning ribs is disposed diagonally near the fixing seat; and for each pair of the positioning ribs, one or both of the pair of positioning ribs disposed diagonally are shared by two adjacent fixing seats.

In certain exemplary embodiments, each of the positioning ribs has a screw hole, the elastic piece has a through hole corresponding to the screw hole, and the elastic piece is assembled to a corresponding one of the positioning ribs by a screw corresponding to the screw hole and through hole.

In certain exemplary embodiments, the screw holes are distributed symmetrically about the center of each laser.

A further aspect of the present disclosure relates to a method for manufacturing a laser beam collimation apparatus, including: assembling a collimating lens to a collimating lens seat to form a first component, and assembling a laser to a laser seat to form a second component; applying a photosensitive adhesive on at least one of a surface of the first component and a surface of the second component for assembling a transparent rigid ring, and bonding the transparent rigid ring to the photosensitive adhesive applied on the at least one of the first component and the second component to form a third component; collimating the third component relative to the second component or the first component three-dimensionally; and when collimation is completed, curing the photosensitive adhesive to form the laser beam collimation apparatus.

In certain exemplary embodiments, the step of collimating the third component relative to the second component or the first component three-dimensionally includes at least one of the following steps: adjusting a distance between the third component and the second component or the first component; and adjusting coaxiality of the third component and the second component or the first component.

These and other aspects of the disclosure will become apparent from the following description of several exemplary embodiments taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more exemplary embodiments of the disclosure and together with the written description, serve to explain the principles of the disclosure. Wherever possible, the same reference numbers are used throughout the drawings to refer to the same or like elements of an exemplary embodiment.

DETAILED DESCRIPTION OF THE DISCLOSURE

Figure 1A:
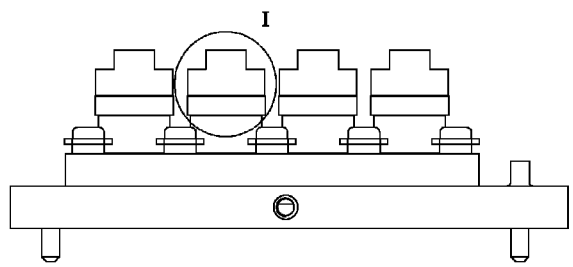
FIG. 1A schematically shows a laser beam collimation apparatus according to one exemplary embodiment of the present disclosure.

The disclosure will now be described hereinafter with reference to the accompanying drawings, in which several exemplary embodiments of the disclosure are shown. This disclosure may, however, be embodied in many different forms and should not be construed as limited to the exemplary embodiments set forth herein.

The terms used in this specification generally have their ordinary meanings in the art, within the context of the disclosure, and in the context where each term is used. Certain terms that are configured to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various exemplary embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

The description will be made as to the exemplary embodiments of the disclosure in conjunction with the accompanying drawings in FIGS. 1-14. It should be understood that exemplary embodiments described herein are merely used for explaining the disclosure, but are not intended to limit the disclosure. In accordance with the purposes of this disclosure, as embodied and broadly described herein, this disclosure, in certain aspects, relates to a laser beam collimation apparatus and a manufacturing method thereof.

Figure 1B:
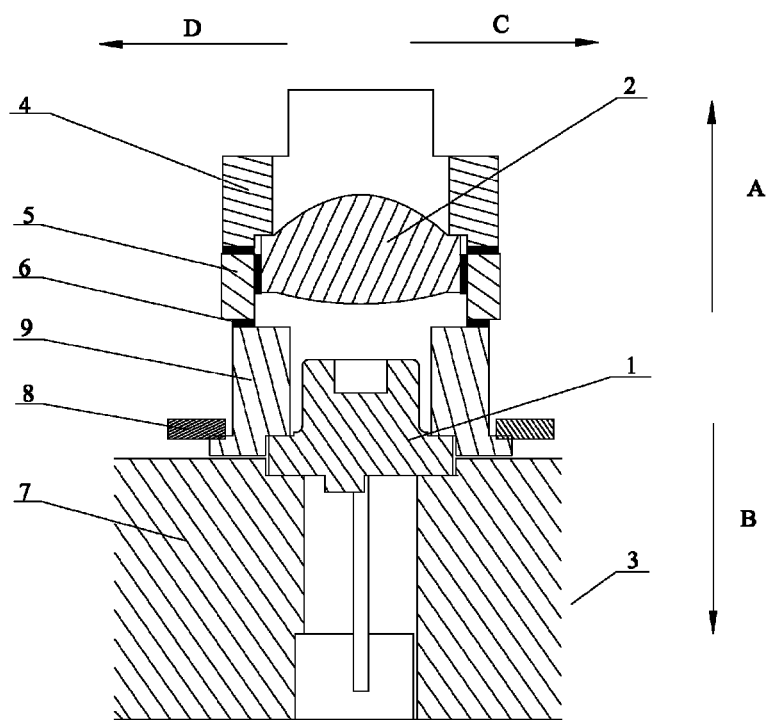
FIG. 1B schematically shows a sectional view of a partially enlarged part I as shown in FIG. 1A.

FIGS. 1A and 1B show a laser beam collimation apparatus. As shown in the figures, the laser beam collimation apparatus includes a laser 1 and a collimating lens 2 opposite to the laser 1. The laser 1 is mounted on a laser seat 3, and the collimating lens 2 is mounted on a collimating lens seat 4. In certain exemplary embodiments, an adapter support may be provided between the collimating lens seat 4 and the laser seat 3. In one exemplary embodiment, the adapter support may be, for example, a transparent rigid ring 5. It should be noted that in certain exemplary embodiments of the present disclosure, the laser 1 may be mounted on the laser seat 3 in various different manners. For example, the laser 1 may be detachably mounted on the laser seat 3, or may be fixed on the laser seat 3. The collimating lens 2 may also be mounted on the collimating lens seat 4 in various different manners. For example, the collimating lens 2 may also be detachably mounted on the collimating lens seat 4, or may be fixed on the collimating lens seat 4.

In certain exemplary embodiments, a photosensitive adhesive may be filled between the adapter support and the laser seat 3, and the photosensitive adhesive may also be filled between the adapter support and the collimating lens seat 4. Further, the photosensitive adhesive may also be filled between the adapter support and the collimating lens 2.

In certain exemplary embodiments, the laser seat 3 may include a base seat and a fixing seat detachably mounted on the base seat. The fixing seat may be detachably mounted on the base seat by an elastic piece, and the elastic piece may have a bump facing the base seat. A side arm of the fixing seat may extend outwards to form a protruding portion, and the protruding portion may have a clamping groove fitting with the bump. The base seat may further include at least one positioning rib near the fixing seat, and the fixing seat may abut the positioning rib when the fixing seat and the elastic piece are pressed together. The positioning rib may have screw holes, and the elastic piece may be assembled to the positioning rib by screws corresponding to the screw holes.

In certain exemplary embodiments, at least one gap is defined between the transparent rigid ring 5 and the laser seat 3 and between the transparent rigid ring 5 and the collimating lens seat 4, and the at least one gap is filled with a photosensitive adhesive. Specifically, the at least one gap may include at least one of a first gap defined between the transparent rigid ring 5 and the laser seat 3, and a second gap defined between the transparent rigid ring 5 and the collimating lens seat 4. In other words, a first gap may be defined between the transparent rigid ring 5 and the laser seat 3, and the first gap may be filled with the photosensitive adhesive 6; and/or a second gap may be defined between the transparent rigid ring 5 and the collimating lens seat 4, and the second gap may be filled with the photosensitive adhesive 6.

In the laser beam collimation apparatus as shown in FIGS. 1A and 1B, the transparent rigid ring 5 serves as the adapter support, and the photosensitive adhesive may be used to bond the transparent rigid ring 5 with at least one of the laser seat 3 and the collimating lens seat 4. In other words, the transparent rigid ring 5 and the laser seat 3 may be bonded by the photosensitive adhesive, and/or the transparent rigid ring 5 and the collimating lens seat 4 may be bonded by the photosensitive adhesive. The photosensitive adhesive 6 is used because it is cured only when irradiated by ultraviolet light and not cured without irradiation with the ultraviolet light. During a process of assembling the collimating lens 2 and the laser 1, the transparent rigid ring 5 may be adhered to at least one of the laser seat 3 and the collimating lens seat 4 by the uncured photosensitive adhesive 6. In other words, the transparent rigid ring 5 and the laser seat 3 may be adhered together by the uncured photosensitive adhesive 6, and/or the transparent rigid ring 5 and the collimating lens seat 4 may be adhered together by the uncured photosensitive adhesive 6. Then the relative positions and coaxiality of the collimating lens 2 and the laser 1 may be adjusted using a clamping fixture and a three-dimensional adjustor. After the adjustment, the photosensitive adhesive 6 may be cured through irradiation with ultraviolet light. Therefore, the relative positions and coaxiality of the collimating lens 2 and the laser 1 are maintained within a preset range, such that the collimating lens 2 can desirably perform its intended functions, so as to obtain a desirable light spot.

As shown in FIG. 1B, the relative positions and coaxiality of the collimating lens 2 and the laser 1 may be adjusted along the directions A, B, C, and D, and the adjustment may include translational movements and rotation of the collimating lens 2. In one state as shown in FIG. 1B, the collimating lens 2 may perform a vertical translational movement relative to the gap between the transparent rigid ring 5 and the collimating lens seat 4 and/or the gap between the transparent rigid ring 5 and the laser seat 3, such that the relative distance between the collimating lens 2 and the laser 1 may be adjusted. The collimating lens 2 may perform a transverse translational movement relative to the gap between the transparent rigid ring and the collimating lens seat and/or the gap between the transparent rigid ring and the laser seat, such that the coaxiality of an axis of the collimating lens and an axis of the laser may be adjusted. The collimating lens 2 may rotate relative to the gap between the transparent rigid ring and the collimating lens seat and/or the gap between the transparent rigid ring and the laser seat, such that coaxiality of the collimating lens 2 relative to the laser 1 may be adjusted. By these three manners, the relative distance and coaxiality of the collimating lens 2 and the laser 1 may be adjusted. A gap may be provided between the collimating lens seat 4 and the transparent rigid ring 5, and the collimating lens seat 4 and the transparent rigid ring 5 may be bonded by the photosensitive adhesive. A gap may be provided between the laser seat 3 and the transparent rigid ring 5, and the laser seat 3 and the transparent rigid ring 5 may be bonded by the photosensitive adhesive.

As shown in FIG. 1B, a third gap may be provided between the transparent rigid ring 5 and the collimating lens 2, and the third gap may be filled with the photosensitive adhesive 6. In certain exemplary embodiments, the collimating lens 2 may protrude from the collimating lens seat 4 and extend into the transparent rigid ring 5. In this case, a certain gap needs to be left between the collimating lens 2 and the transparent rigid ring 5, such that the collimating lens 2 may be capable of performing slight translational movement and rotation relative to the transparent rigid ring 5.

In certain exemplary embodiments, the transparent rigid ring 5 may be a quartz glass ring. Quartz glass has desirable performance of ultraviolet spectrum transmittance, and has better mechanical performance than that of common glass. The performance of ultraviolet spectrum transmittance of the quartz glass ring enables the photosensitive adhesive 6 on a bonding surface (the surface adjacent to the photosensitive adhesive 6) to cure, thereby further improving the bonding strength thereof.

The above-described components are further hereinafter described in the following exemplary embodiments.

Base Seat

Figure 2:
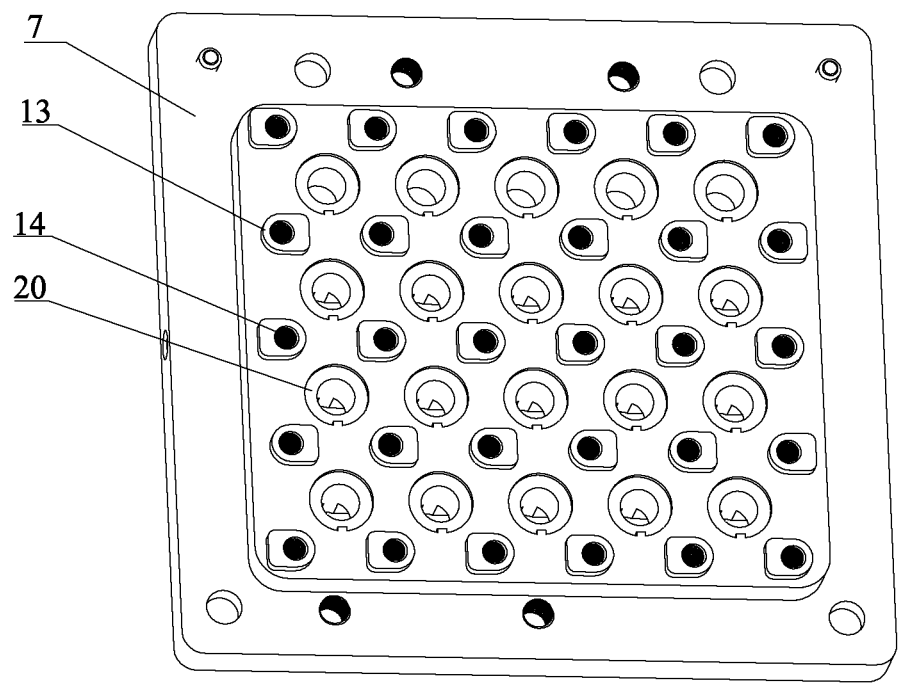
FIG. 2 schematically shows a base seat according to one exemplary embodiment of the present disclosure.
Figure 3:
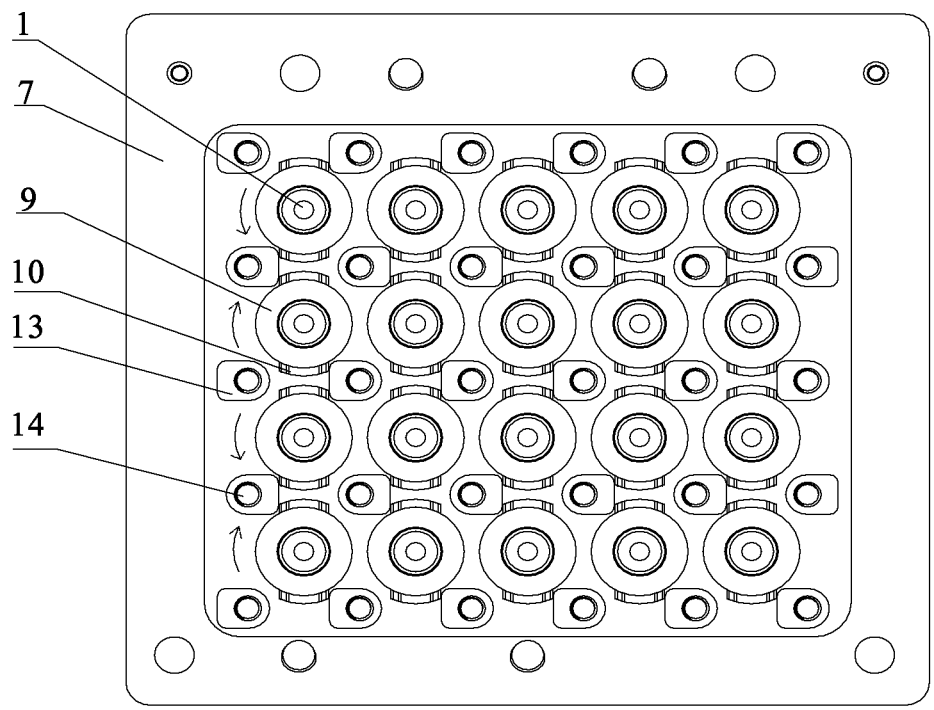
FIG. 3 schematically shows lasers and fixing seats being mounted on a base seat according to one exemplary embodiment of the present disclosure.
Figure 4:
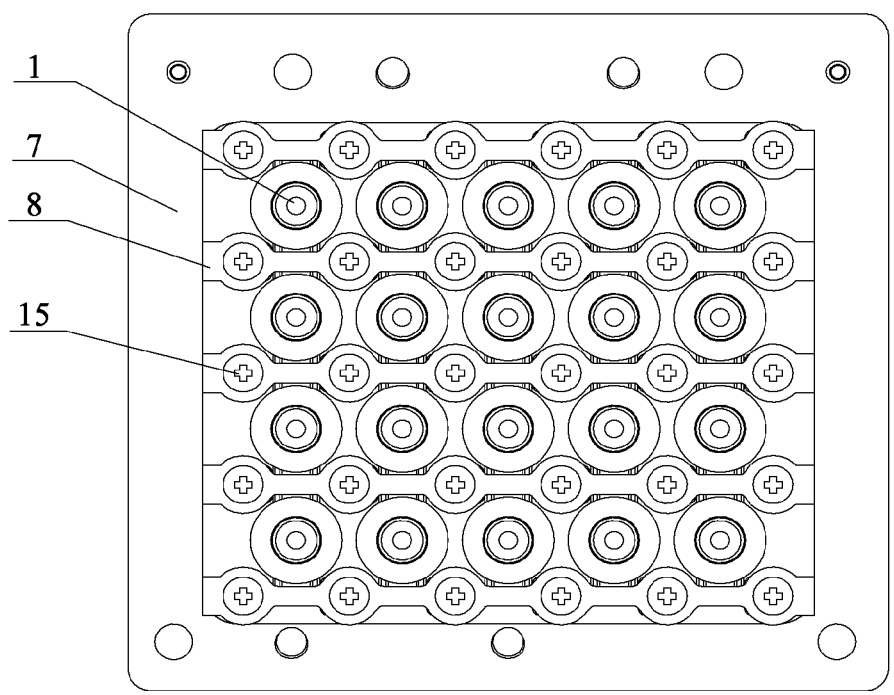
FIG. 4 schematically shows lasers and fixing seats being assembled on a base seat by elastic pieces according to one exemplary embodiment of the present disclosure.

With reference to FIGS. 2, 3, and 4, a base seat may include laser grooves 20, positioning ribs 13, and screw holes 14.

Figure 6:
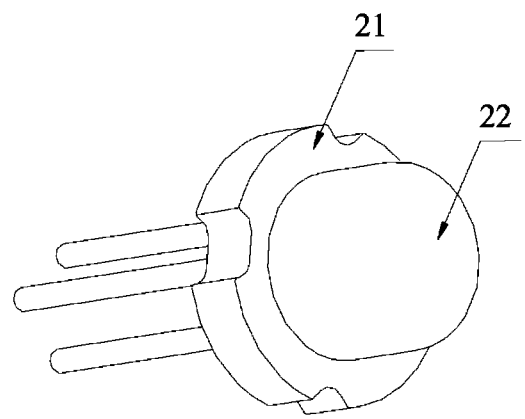
FIG. 6 schematically shows a laser according to one exemplary embodiment of the present disclosure.

Each of the laser grooves 20 may be used to place a laser 1 therein. The size of each laser groove 20 may be manufactured according to the size of a substrate 21 (as shown in FIG. 6) of the laser being used. The depth of each laser groove 20 may be shorter than the thickness of the substrate 21 of the laser. For example, the depth of the laser groove 20 may be about 0.1 mm shorter than the thickness of the substrate 21 of the laser, such that the fixing seat 9 may abut the laser 1 tightly. The number of the laser grooves 20 may be related to the number of lasers 1. Generally speaking, the number of the laser grooves 20 may be no fewer than that of the lasers 1. For example, if the number of the lasers is 20, the number of the laser grooves may be 20 or more.

Each of the positioning ribs 13 is used for facilitating assembly of the fixing seat 9. During assembly, a side surface of the protruding portion 10 of the fixing seat 9 may abut a positioning surface of the positioning rib 13 on the base seat 7. The elastic piece 8 abuts a top surface of the positioning rib 13.

The screw holes 14 may be used to fix the elastic pieces 8, and a thread may be manufactured on an inner surface of each of the screw holes 14. The center of each screw hole 14 may be distributed symmetrically about the center of the laser groove 20, such that the screwing force is evenly distributed on the laser. In certain exemplary embodiments, the center of the screw hole 14 may further be arranged in any other manner.

Laser

FIG. 6 shows an external structure of a laser according to one exemplary embodiment of the present disclosure. The laser may include a laser plate 21 and a laser cap 22. It should be noted that FIG. 6 shows the external structure of one type of lasers. However, the laser 1 as described in the disclosure may have any other suitable structure.

Fixing Seat

Figure 5:
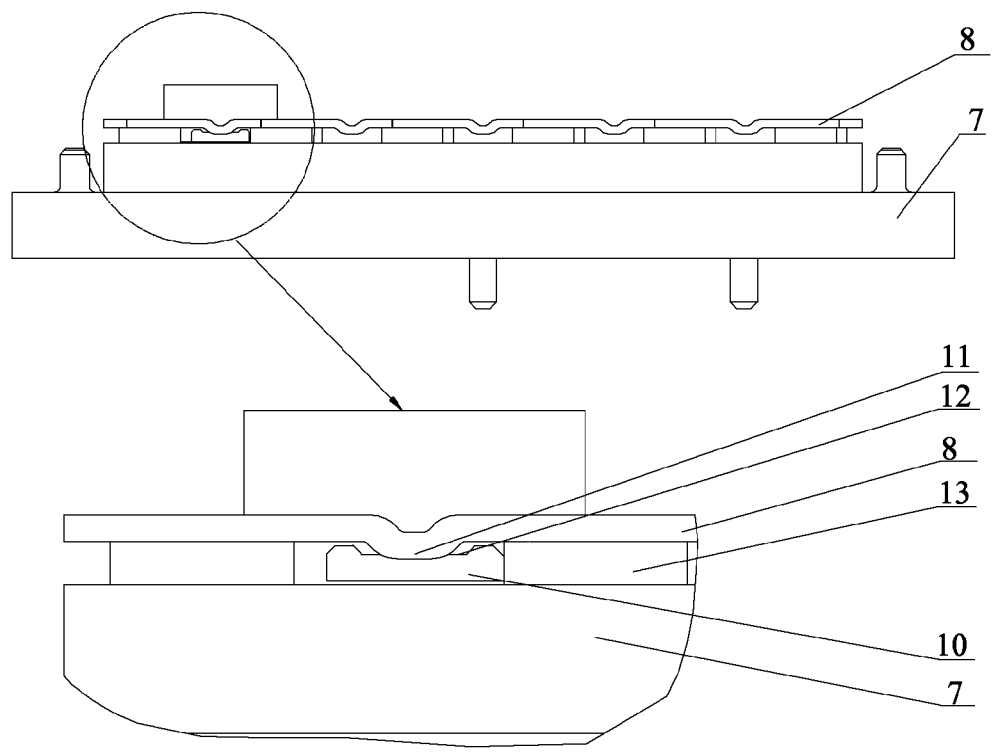
FIG. 5 schematically shows a bump of an elastic piece and a protruding portion of a fixing seat being pressed together according to one exemplary embodiment of the present disclosure.
Figure 7:
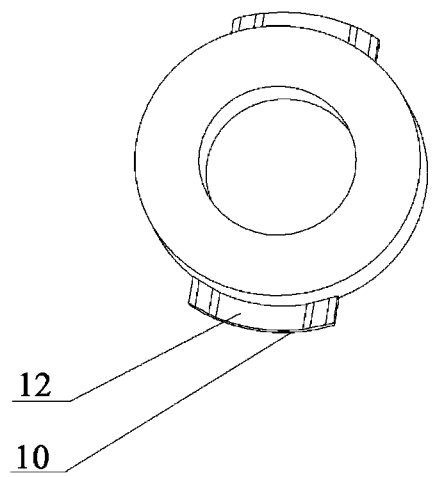
FIG. 7 schematically shows an enlarged fixing seat according to one exemplary embodiment of the present disclosure.

As shown in FIGS. 3, 5 and 7, the fixing seat 9 includes a protruding portion 10 and a positioning hole. The positioning hole is located at the center of the fixing seat 9, and the protruding portion 10 may be distributed symmetrically about the positioning hole.

The protruding portion 10 has a clamping groove 12, and the clamping groove 12 has a preset depth. For example, the preset depth may be about 0.3 mm. In certain exemplary embodiments, the two sides of the clamping groove 12 may be designed to have movable bayonets, such as a chamfer design, for example, so as to facilitate assembly and disassembly of the fixing seat 9.

The design of the positioning hole facilitates assembly of an adapter support (for example, a transparent rigid ring), and the shape and size of the positioning hole may be determined according to the shape and size of the laser cap 22 (as shown in FIG. 6). For example, when the laser cap is circular, the positioning hole may also be designed to be circular. A gap may be reserved between the positioning hole and the laser cap.

Elastic Piece

As shown in FIGS. 4 and 5, an elastic piece 8 includes a bump 11 and a through hole.

A convex surface of the bump 11 and a concave surface of the clamping groove 12 on the fixing seat 9 may be designed to interfere with each other, such that a certain pressing amount may be provided between the convex surface and the concave surface. For example, the pressing amount may be about 0.2 mm. A gap may be reserved between the bump 11 at a single side of the clamping groove 12 on the fixing seat 9. For example, the gap may be about 0.5 mm.

The through hole may facilitate fixing of the elastic piece 8 on the base seat 7.

The convex surface of the bump 11 and the concave surface of the clamping groove 12 on the fixing seat 9 may press against each other, and the elastic piece 8 may tightly abut a top surface of the positioning rib 13.

Transparent Rigid Ring

The inner diameter of the transparent rigid ring 5 may be designed based on the diameter of the collimating lens 2. Further, a certain gap may be reserved between the inner diameter of the transparent rigid ring 5 and the diameter of the collimating lens, thereby facilitating assembly of the transparent rigid ring 5. For example, the gap may be about 0.1 mm. The outer diameter of the transparent rigid ring 5 may be designed according to a minimum center-to-center distance of the lasers 1 in an array arrangement, so as to avoid interference during assembly. A center-to-center distance refers to a distance between centers of two adjacent lasers 1, which is applicable to a case of a laser array. For example, the minimum center-to-center distance may be about 9 mm, and the outer diameter of the transparent rigid ring 5 may be about 8.5 mm. The height of the transparent rigid ring 5 may be designed according to a distance between the collimating lens seat 4 and the fixing seat 9. For example, the distance between the collimating lens seat 4 and the fixing seat 9 may be about 2.25 mm, from which a reserved gap of about 0.1 mm, and a gap of about 0.15 mm reserved between the fixing seat 4 and the transparent rigid ring 9 may be subtracted, such that a design value of the length of the transparent rigid ring 5 may be about 2 mm.

The transparent rigid ring 5 may be formed of a quartz glass material. Quartz glass has desirable performance of ultraviolet spectrum transmittance, and has desirable mechanical performance. The performance of ultraviolet spectrum transmittance of the quartz glass ring enables the photosensitive adhesive on the bonding surface to cure, thereby further improving the bonding strength thereof.

Collimating Lens

The collimating lens 2 may be mounted on the collimating lens seat 4 in a fixed manner, or may be detachably mounted on the collimating lens seat 4.

Collimating Lens Seat

Figure 8:
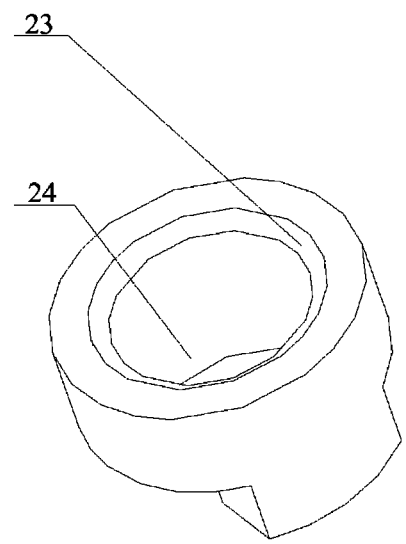
FIG. 8 schematically shows a collimating lens seat according to one exemplary embodiment of the present disclosure.

As shown in FIG. 8, the collimating lens seat 4 may include a bonding groove 23 and a lens seat through hole 24.

Generally, as shown in FIGS. 2 to 5, the laser seat 3 includes the base seat 7. Each of the fixing seats 9 may be detachably mounted on the base seat 7 by the corresponding elastic piece 8, and a certain slit may be provided between the elastic piece 8 and the base seat 7 when the elastic piece 8 is fixed on the base seat 7. A side wall of the fixing seat 9 may extend outwards to form the protruding portion 10, and during disassembly or replacement of the laser, the fixing seat 9 moves relative to the elastic piece 8, such that the protruding portion 10 is received in the slit or is detached from the slit. Generally, the laser 1 may be placed in the laser groove 20 on the base seat 7, and then the fixing seat 9 may press the laser 1 towards the base seat 7. Generally, the fixing seat 9 may be movable, and the fixing seat 9 enables the protruding portion 10 on the fixing seat 9 to extend into the slit formed by the elastic piece 8 fixed on the base seat 7, such that the fixing seat 9 is fixed on the base seat 7. During disassembly of a laser, the protruding portion 10 on the fixing seat 9 may be detached from the gap formed by the elastic piece 8 fixed on the base seat 7, such that the fixing seat 9 is detached from the base seat 7, thereby facilitating assembly and disassembly of the laser. For a laser array including multiple lasers, disassembly of a single laser becomes more convenient. As shown in FIG. 5, the elastic piece 8 may be provided with the bump 11 facing the base seat, and the protruding portion 10 may be provided with a clamping groove 12 fitting with the bump 11. During disassembly or replacement of the laser, the fixing seat 9 may rotate relative to the elastic piece 8, such that the clamping groove 12 and the bump 11 are pressed together for the protruding portion 10 to be received in the slit, or the clamping groove 12 may be detached from the bump 11 to detach the protruding portion 10 from the slit. The bump 11 is provided on the elastic piece 8, and the clamping groove 12 fitting with the bump 11 is provided on the protruding portion 10, thereby further facilitating pressing and positioning of the elastic piece 8 and the protruding portion 10. Generally, the laser may be circular, and correspondingly, the fixing seat 9 may also be circular. By rotating the circular fixing seat 9, the clamping groove 12 on the protruding portion 10 of the fixing seat 9 and the bump 11 of the elastic piece 8 may be pressed together or detached from each other.

In certain exemplary embodiments, a preset pressing amount may be provided when the bump 11 and the clamping groove 12 are pressed together, for example, as shown in FIG. 5. In this way, the elastic piece 8 may better utilize the elasticity of the elastic piece 8 to press the fixing seat 9 on the base seat 7, such that assembly of the laser 1 may be firm.

As shown in FIG. 5, when the bump 11 and the clamping groove 12 are pressed together, the bump 11 contacts a middle portion of the clamping groove 12 to form a fourth gap between each of two sides of the bump 11 and the clamping groove 12, respectively. In this way, in an assembly process, the bump 11 and the clamping groove 12 may be completely pressed together to prevent the clamping groove 12 from sliding off from the bump 11.

Further, as shown in FIGS. 2, 3, and 5, the base seat 7 may include a pair of positioning ribs 13 disposed diagonally near the fixing seat 9, and the fixing seat 9 and the elastic piece 8 may abut the positioning ribs 13 when being pressed together. During an assembly process, the bump 11 and the clamping groove 12 may be pressed together by rotating the fixing seat 9, so as to complete the assembly process. When the bump 11 and the clamping groove 12 are pressed together, the protruding portion 10 of the fixing seat 9 may abut a positioning surface of the positioning ribs 13. During disassembly, the fixing seat 9 may be rotated in a reverse direction until the bump 11 and the clamping groove 12 are detached, such that the fixing seat 9 may be removed.

As shown in FIG. 3, the base seat 7 may be disposed with a plurality of lasers 1 and a plurality of fixing seats 9, and each of the lasers 1 may one-by-one corresponds to one of the fixing seats 9. In certain exemplary embodiments, the lasers 1 may be evenly disposed on the base seat 7, or may be disposed on the base seat 7 in any other manner. For each fixing seat 9, a pair of positioning ribs 13 may be disposed diagonally near the fixing seat 9. Further, in certain exemplary embodiments, one or both of the pair of positioning ribs 13 diagonally disposed may be shared by two adjacent fixing seats 9. For example, generally, for each laser, four positioning ribs 13 may be arranged to be near the laser. Of the four positioning ribs 13, one pair of positioning ribs 13 may be used for positioning a fixing seat 9 corresponding to the laser, and the other pair may be used for positioning a fixing seat 9 corresponding to an adjacent laser. With such arrangement, space may be saved, allowing the overall structure to be more compact. In another example, one or both of a pair of positioning ribs 13 diagonally disposed may be shared by two adjacent fixing seats 9, and the positioning ribs 13 for the adjacent fixing seats 9 may overlap. In a further example, the positioning ribs 13 for the adjacent fixing seats 9 may be combined into one single structure, such that the adjacent fixing seats 9 share a single positioning rib 13. In this way, a manufacturing process may be simplified, allowing the overall structure to be more compact. In certain exemplary embodiments, a positioning rib arranged to be near each laser may be utilized only for fixing a fixing seat (not shown) corresponding to the laser. In other words, the two adjacent lasers do not share a positioning rib.

In certain exemplary embodiments, optionally, each of the positioning ribs 13 may be provided with a screw hole 14, and each elastic piece 8 may be provided with a through hole. Thus, each of the elastic pieces 8 may be assembled onto a corresponding positioning rib 13 by a screw 15 corresponding to the screw hole 14. Assembly by screws is relatively convenient. Further, in certain exemplary embodiments, a plurality of elastic pieces 8 in a row may be integrally formed as a single structure, which simplifies a manufacturing process. In certain exemplary embodiments, an elastic piece 8 corresponding to each screw hole 14 may further exist separately. In other words, each of the elastic pieces 8 is not connected to one another (not shown).

As shown in FIGS. 2, 3, and 4, the screw holes 14 may be distributed symmetrically about the center of the laser 1. In this way, a force may be evenly distributed on the fixing seat 9, which further enhances facilitation of design and manufacturing. In certain exemplary embodiments, the screw holes 14 may further be arranged in another manner.

Figure 13:
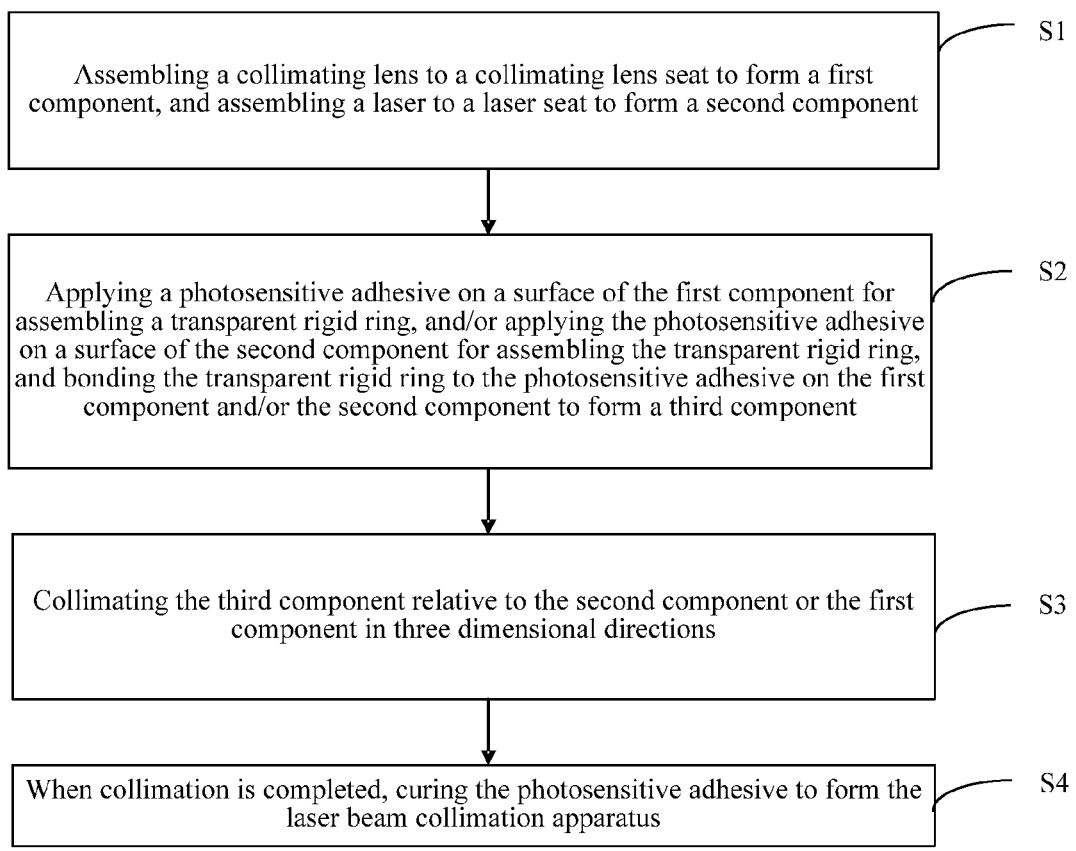
FIG. 13 shows a flowchart of a method for manufacturing a laser beam collimation apparatus according to one exemplary embodiment of the present disclosure.
Figure 14:
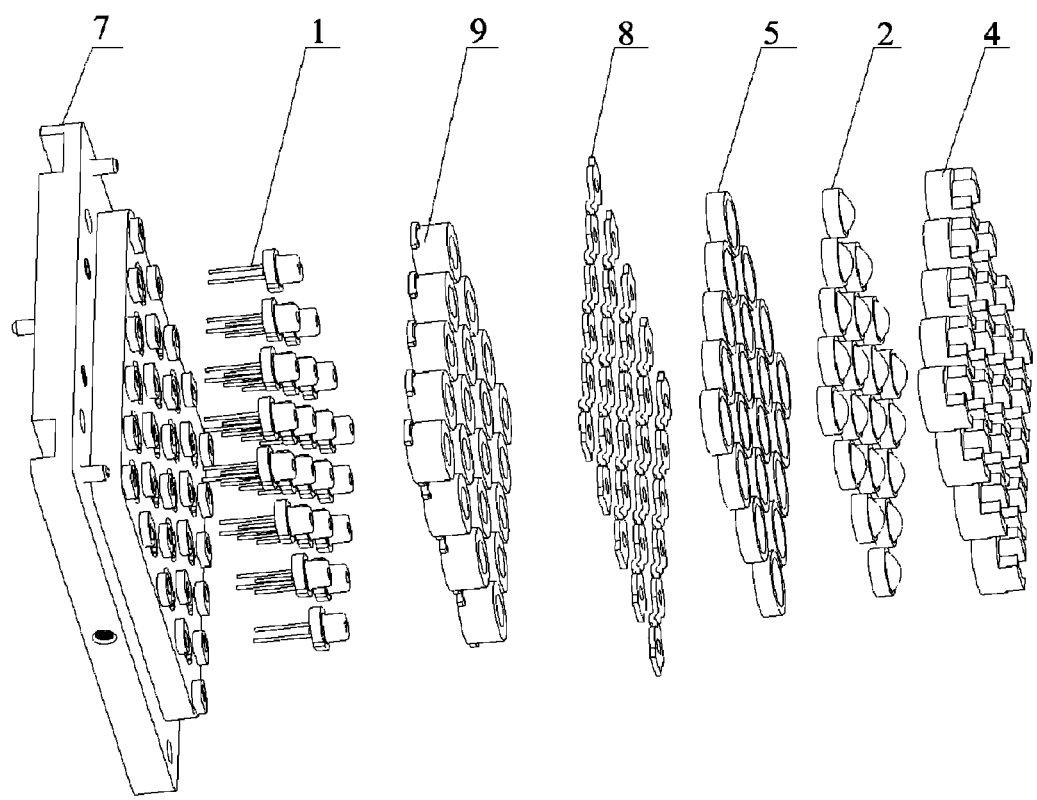
FIG. 14 schematically shows an exploded view of an assembly of lasers and collimating lenses according to one exemplary embodiment of the present disclosure.

FIG. 13 shows a flowchart of a method for manufacturing a laser beam collimation apparatus according to one exemplary embodiment of the present disclosure. Further referring to FIG. 14 in combination, the method may include:

Step S1: Assembling a collimating lens to a collimating lens seat to form a first component, and assembling a laser to a laser seat to form a second component, where the assembly may be performed in a fixing manner, or may be performed in a detachable manner.

Figure 11:
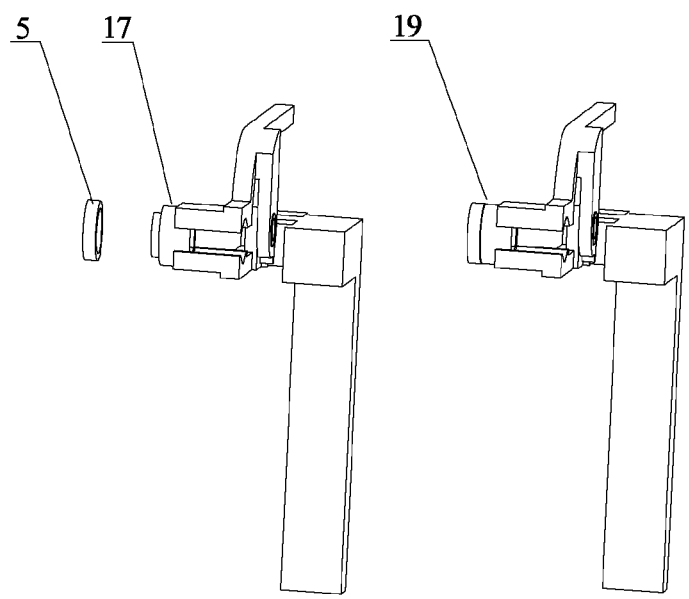
FIG. 11 schematically shows a first component and a transparent rigid ring being assembled to form a third component according to one exemplary embodiment of the present disclosure.

Step S2: Applying a photosensitive adhesive on a surface of the first component for assembling a transparent rigid ring, and/or applying the photosensitive adhesive on a surface of the second component for assembling the transparent rigid ring, and bonding the transparent rigid ring to the photosensitive adhesive on the first component and/or the second component to form a third component (as shown in FIG. 11). In other words, the photosensitive adhesive is applied on at least one of the surface of the first component and the surface of the second component for assembling the transparent rigid ring, and then the transparent rigid ring is bonded to the photosensitive adhesive applied on the at least one of the first component and the second component to form a third component.

Step S3: Collimating the third component as shown in FIG. 11 relative to the second component or the first component in three dimensional directions.

Step S4: When collimation is completed, curing the photosensitive adhesive to form the laser beam collimation apparatus.

Figure 9:
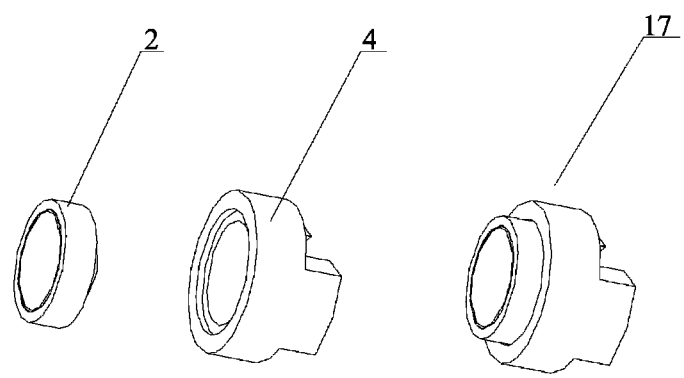
FIG. 9 schematically shows a collimating lens being fixed on a collimating lens seat to form a first component according to one exemplary embodiment of the present disclosure.
Figure 10:
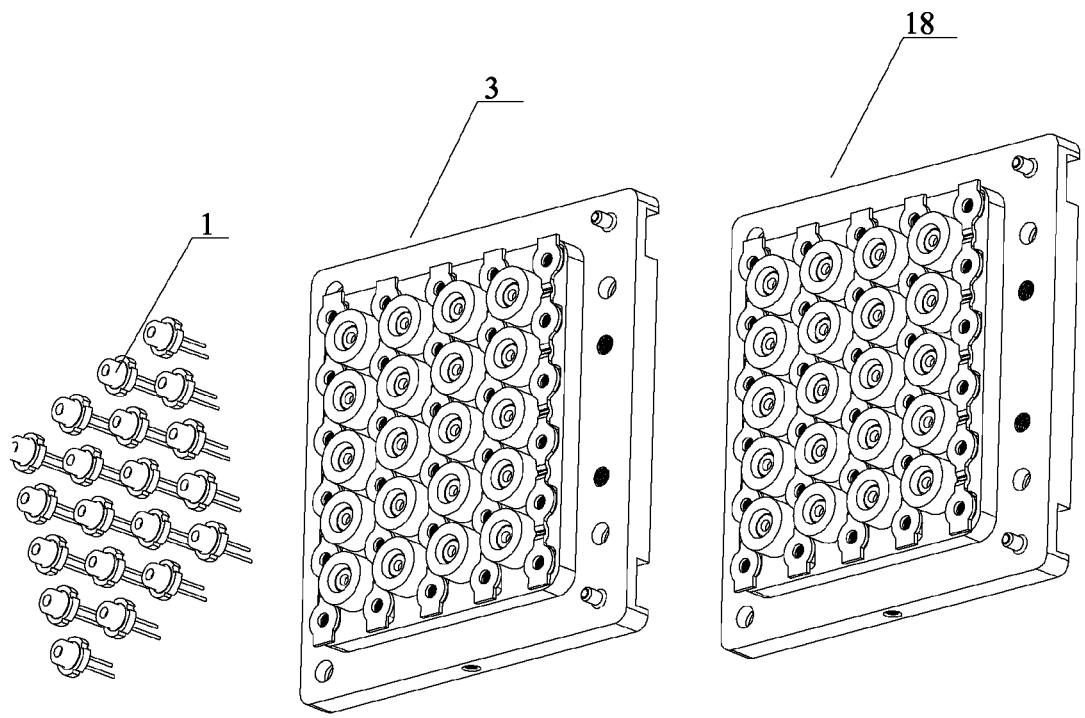
FIG. 10 schematically shows lasers being fixed on laser seats to form a second component according to one exemplary embodiment of the present disclosure.
Figure 12:
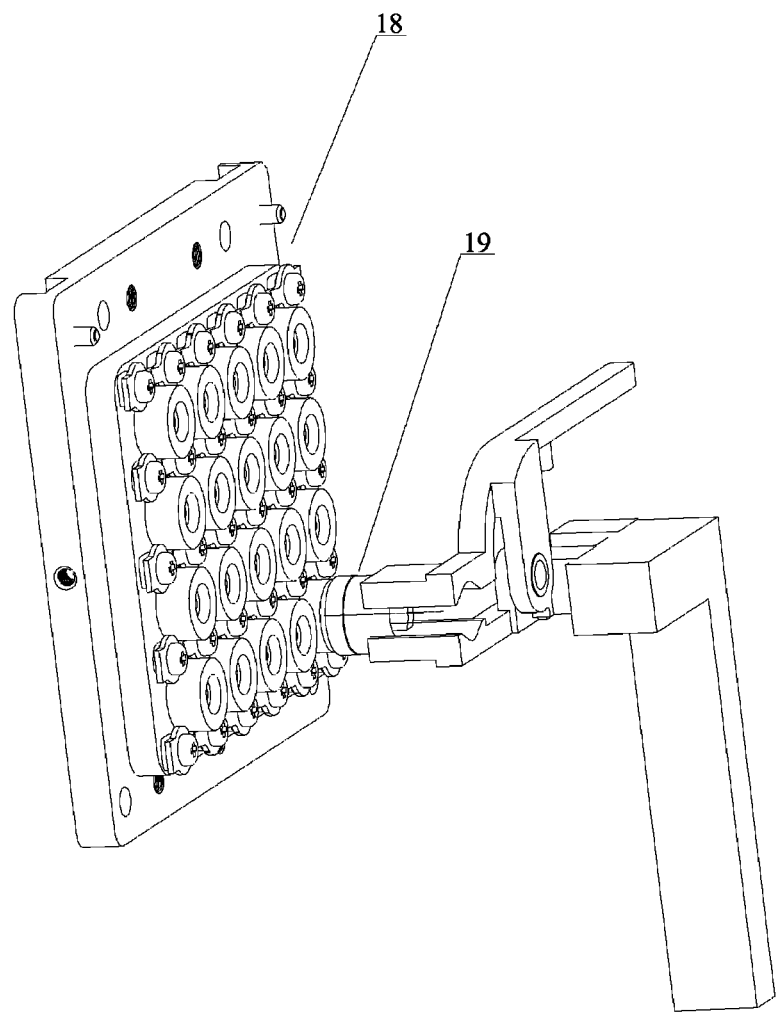
FIG. 12 schematically shows a third component being collimated relative to a second component according to one exemplary embodiment of the present disclosure.

Reference for the Step S1 may further be made to FIGS. 9 and 10, and reference for the Step S2 may further be made to FIG. 11. As shown in FIG. 11, the transparent rigid ring and the photosensitive adhesive on the first component are bonded to form the third component. Reference for the Step S3 may further be made to FIG. 12. FIG. 12 schematically shows a third component being collimated relative to a second component using a three-dimensional adjustor according to one exemplary embodiment of the present disclosure.

In FIGS. 9 to 11, the first component is marked as 17, the second component is marked as 18, and the third component is marked as 19.

The collimating lens may be mounted to the collimating lens seat using adhesive bonding, and the adhesive bonding medium may be a photosensitive adhesive or an optical adhesive. Further, at least one of the first component and the second component may be fixed on a three-dimensional adjustor by a clamping fixture to perform collimation. The photosensitive adhesive may be cured through irradiation with ultraviolet light. Because the transparent rigid ring is transparent, a surface applied with the adhesive may be irradiated by ultraviolet light, so as to ensure that the photosensitive adhesive (for example, an ultraviolet curing adhesive) on the bonding surface is cured, thereby further improving bonding strength.

In the process of manufacturing the laser beam collimation apparatus, relative positions and coaxiality of the laser and the collimating lens may be adjusted, such that the relative positions and coaxiality of the collimating lens and the laser are maintained within a preset range.

In certain exemplary embodiments, the Step 3 may include at least one of the following steps:

adjusting a distance between the third component and the second component or the first component; and adjusting coaxiality of the third component and the second component or the first component.

The relative positions and/or the coaxiality of the collimating lens 2 and the laser 1 may be adjusted in the directions A, B, C, and D, as shown in FIG. 1B. In a state as shown in FIG. 1B, the collimating lens may perform a vertical translational movement relative to the gap between the transparent rigid ring and the collimating lens seat and/or the gap between the transparent rigid ring and the laser seat, such that the relative distance between the collimating lens and the laser can be adjusted. The collimating lens may perform a transverse translational movement relative to the gap between the transparent rigid ring and the collimating lens seat and/or the gap between the transparent rigid ring and the laser seat, such that the center of the collimating lens and the center of the laser can be aligned and adjusted. The collimating lens may rotate relative to the gap between the transparent rigid ring and the collimating lens seat and/or the gap between the transparent rigid ring and the laser seat, such that coaxiality of the collimating lens relative to the laser can be adjusted. With such adjustments, the relative distance and/or coaxiality of the collimating lens 2 and the laser 1 may be adjusted.

It should be noted that the laser beam collimation apparatus and the method for manufacturing a laser beam collimation apparatus in the above-described exemplary embodiments are not only applicable to a single laser, but also applicable to a laser array (which is formed by multiple lasers). When the laser beam collimation apparatus is applied to a laser array, adjustment of relative positions and coaxiality of each laser in the laser array and a collimating lens corresponding to the laser may be an individually independent process, which may be independent from the adjustments of others laser in the laser array and other corresponding collimating lenses.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The exemplary embodiments were chosen and described in order to explain the principles of the disclosure and their practical application so as to activate others skilled in the art to utilize the disclosure and various exemplary embodiments and with various modifications as are suited to the particular use contemplated. Alternative embodiments will become apparent to those skilled in the art to which the disclosure pertains without departing from its spirit and scope. Accordingly, the scope of the disclosure is defined by the appended claims rather than the foregoing description and the exemplary embodiments described therein.

What is claimed is:

1. A laser beam collimation apparatus, comprising:
   a laser; and
   a collimating lens disposed opposite to the laser,
   wherein the laser is detachably mounted on a laser seat, and the collimating lens is detachably mounted on a collimating lens seat;
   wherein an adapter support is provided between the collimating lens seat and the laser seat; and
   wherein a photosensitive adhesive is filled in at least one of a first gap defined between the adapter support and the laser seat and a second gap defined between the adapter support and the collimating lens seat.

2. The laser beam collimation apparatus according to claim 1, wherein a photosensitive adhesive is filled between the adapter support and the collimating lens.

3. The laser beam collimation apparatus according to claim 1, wherein the laser seat comprises a base seat and a fixing seat detachably mounted on the base seat.

4. The laser beam collimation apparatus according to claim 3, wherein
   the fixing seat is detachably mounted on the base seat by an elastic piece,
   the elastic piece has a bump facing the base seat,
   a side arm of the fixing seat extends outwards to form a protruding portion, and
   the protruding portion has a clamping groove fitting with the bump.

5. The laser beam collimation apparatus according to claim 4, wherein the base seat comprises at least one positioning rib near the fixing seat, and the fixing seat abuts the at least one positioning rib when the fixing seat and the elastic piece are pressed together.

6. The laser beam collimation apparatus according to claim 5, wherein each of the at least one positioning rib has a screw hole, and the elastic piece is fixed onto the positioning rib by a screw corresponding to the screw hole.

7. A laser beam collimation apparatus, comprising:
a laser; and
a collimating lens disposed opposite to the laser,
wherein the laser is fixed on a laser seat, and the collimating lens is fixed on a collimating lens seat;
wherein a transparent rigid ring is provided between the collimating lens seat and the laser seat; and
wherein at least one gap is provided between the transparent rigid ring and the laser seat and between the transparent rigid ring and the collimating lens seat, and the at least one gap is filled with a photosensitive adhesive, wherein the at least one gap comprises at least one of a first gap between the transparent rigid ring and the laser seat and a second gap between the transparent rigid ring and the collimating lens seat.

8. The laser beam collimation apparatus according to claim 7, wherein a third gap is provided between the transparent rigid ring and the collimating lens, and the third gap is filled with the photosensitive adhesive.

9. The laser beam collimation apparatus according to claim 8, wherein the transparent rigid ring is a quartz glass ring.

10. The laser beam collimation apparatus according to claim 7, wherein
the laser seat comprises a base seat,
a fixing seat is detachably mounted on the base seat by an elastic piece,
a slit is provided between the elastic piece and the base seat when the elastic piece is fixed on the base seat,
a side wall of the fixing seat extends outwards to form a protruding portion, and
the fixing seat is movable relative to the elastic piece, such that the protruding portion is received in the slit or is detached from the slit.

11. The laser beam collimation apparatus according to claim 10, wherein
the elastic piece has a bump facing the base seat,
the protruding portion has a clamping groove fitting with the bump, and
the fixing seat is rotatable relative to the elastic piece, such that the clamping groove and the bump are pressed together to receive the protruding portion in the gap, or the clamping groove is detached from the bump to detach the protruding portion from the gap.

12. The laser beam collimation apparatus according to claim 11, wherein a preset pressing amount exists when the bump and the clamping groove are pressed together.

13. The laser beam collimation apparatus according to claim 12, wherein when the bump and the clamping groove are pressed together, the bump contacts a middle portion of the clamping groove to form a fourth gap between each of two sides of the bump and the clamping groove, respectively.

14. The laser beam collimation apparatus according to claim 13, wherein the base seat comprises a pair of positioning ribs disposed diagonally surrounding the fixing seat, and the fixing seat abuts the positioning ribs when the fixing seat and the elastic piece are pressed together.

15. The laser beam collimation apparatus according to claim 14, wherein
the base seat is disposed with a plurality of lasers and a plurality of fixing seats arranged in arrays and corresponding one-by-one to each other,
the base seat comprises a plurality of pairs of positioning ribs, and for each of the fixing seats, one of the plurality of pairs of positioning ribs is disposed diagonally near the fixing seat, and
for each pair of the positioning ribs, one or both of the pair of positioning ribs disposed diagonally are shared by two adjacent fixing seats.

16. The laser beam collimation apparatus according to claim 15, wherein each of the positioning ribs has a screw hole, the elastic piece has a through hole corresponding to the screw hole, and the elastic piece is assembled to a corresponding one of the positioning ribs by a screw corresponding to the screw hole and through hole.

17. The laser beam collimation apparatus according to claim 16, wherein the screw holes are distributed symmetrically about the center of each laser.

18. A method for manufacturing a laser beam collimation apparatus, comprising:
assembling a collimating lens to a collimating lens seat to form a first component, and assembling a laser to a laser seat to form a second component;
applying a photosensitive adhesive on at least one of a surface of the first component and a surface of the second component for assembling a transparent rigid ring, and bonding the transparent rigid ring to the photosensitive adhesive applied on the at least one of the first component and the second component to form a third component;
collimating the third component relative to the second component or the first component three-dimensionally; and
when collimation is completed, curing the photosensitive adhesive to form the laser beam collimation apparatus.

19. The method for manufacturing a laser beam collimation apparatus according to claim 18, wherein the step of collimating the third component relative to the second component or the first component three-dimensionally comprises at least one of the following steps:
adjusting a distance between the third component and the second component or the first component; and
adjusting coaxiality of the third component and the second component or the first component.

* * * * *